United States Patent
Wang et al.

(10) Patent No.: US 9,237,492 B2
(45) Date of Patent: Jan. 12, 2016

(54) PROVIDING CIRCUIT SWITCHED SERVICE

(71) Applicant: AIRVANA LLC, Chelmsford, MA (US)

(72) Inventors: Yu Wang, Herndon, VA (US); Mingzhe Li, Sudbury, MA (US); Ehsan Daeipour, Southborough, MA (US); Michael McFarland, Newton, MA (US); Erik E. Anderlind, Newton, MA (US)

(73) Assignee: CommScope Technologies LLC, Hickory, NC (US)

( * ) Notice: Subject to any disclaimer, the term of this patent is extended or adjusted under 35 U.S.C. 154(b) by 46 days.

(21) Appl. No.: 13/907,508

(22) Filed: May 31, 2013

(65) Prior Publication Data

US 2014/0003389 A1  Jan. 2, 2014

Related U.S. Application Data (60) Provisional application No. 61/653,458, filed on May 31, 2012.

(51) Int. Cl.
*H04W 36/00* (2009.01)

(52) U.S. Cl.
CPC .................................. *H04W 36/0066* (2013.01)

(58) Field of Classification Search
CPC ................................................ H04W 36/0066
USPC .................................................. 370/331, 332
See application file for complete search history.

(56) References Cited

U.S. PATENT DOCUMENTS

| | | |
|---|---|---|
| 6,711,144 B1 | 3/2004 | Kim et al. |
| 6,731,618 B1 | 5/2004 | Chung et al. |
| 6,741,862 B2 | 5/2004 | Chung et al. |
| 6,781,999 B2 | 8/2004 | Eyuboglu et al. |
| 7,170,871 B2 | 1/2007 | Eyuboglu et al. |
| 7,200,391 B2 | 4/2007 | Chung et al. |
| 7,242,958 B2 | 7/2007 | Chung et al. |
| 7,277,446 B1 | 10/2007 | Abi-Nassif et al. |

(Continued)

OTHER PUBLICATIONS

3rd Generation Partnership Project: Technical Specification Group Services and System Aspects: Circuit Switched (CS) fallback in Evolved Packet System (EPS); Stage 2, Release 10, 3GPP TS 23.272 v10.5.0, Sep. 2009 (79 pages).

(Continued)

*Primary Examiner* — Mohammad Anwar
(74) *Attorney, Agent, or Firm* — Fish & Richardson P.C.

(57) ABSTRACT

An example process performed by a radio network access point configured to provide access to a first network that provides voice services includes: receiving a hand-off request at the radio network access point, where the hand-off request is for user equipment connected to a second network that provides data services; replying to the hand-off request with channel assignment information, where the channel assignment information includes a first code and corresponding to a first communication channel over which the radio network access point is configured to communicate, and where the first communication channel being reserved by various radio network access points; receiving a message from the user equipment indicating that the user equipment has a connection to the radio network access point using the first communication channel; and redirecting the user equipment to a second code and thus a second communication channel to maintain the connection.

27 Claims, 3 Drawing Sheets

(56) References Cited

U.S. PATENT DOCUMENTS

| | | |
|---|---|---|
| 7,299,278 B2 | 11/2007 | Ch'ng et al. |
| 7,515,643 B2 | 4/2009 | Chung |
| 7,558,356 B2 | 7/2009 | Pollman et al. |
| 7,558,588 B2 | 7/2009 | To et al. |
| 7,603,127 B2 | 10/2009 | Chung et al. |
| 7,626,926 B2 | 12/2009 | Abi-Nassif et al. |
| 7,672,682 B2 | 3/2010 | Sharma et al. |
| 7,729,243 B2 | 6/2010 | Ananthaiyer et al. |
| 7,730,189 B2 | 6/2010 | Harikumar et al. |
| 7,751,835 B2 | 7/2010 | Sharma et al. |
| 7,801,487 B2 | 9/2010 | Mehrabanzad et al. |
| 7,831,257 B2 | 11/2010 | Pollman et al. |
| 7,835,698 B2 | 11/2010 | Eyuboglu et al. |
| 7,843,892 B2 | 11/2010 | Mehrabanzad et al. |
| 7,860,513 B2 | 12/2010 | Chung et al. |
| 7,907,571 B2 | 3/2011 | Raghothaman et al. |
| 7,920,541 B2 | 4/2011 | To et al. |
| 7,926,098 B2 | 4/2011 | Chinitz et al. |
| 7,933,619 B2 | 4/2011 | Kim |
| 7,934,001 B2 | 4/2011 | Harikumar et al. |
| 7,953,040 B2 | 5/2011 | Harikumar et al. |
| 7,983,672 B2 | 7/2011 | Humblet et al. |
| 7,983,708 B2 | 7/2011 | Mehrabanzad et al. |
| 7,995,493 B2 | 8/2011 | Anderlind et al. |
| 8,023,439 B2 | 9/2011 | Rao |
| 8,060,058 B2 | 11/2011 | Ch'ng et al. |
| 8,078,165 B2 | 12/2011 | Mate et al. |
| 8,085,696 B2 | 12/2011 | Garg et al. |
| 8,094,630 B2 | 1/2012 | Garg et al. |
| 8,099,504 B2 | 1/2012 | Cherian et al. |
| 8,111,253 B2 | 2/2012 | Rao |
| 8,130,686 B2 | 3/2012 | Rao et al. |
| 8,140,091 B2 | 3/2012 | Chung et al. |
| 8,145,221 B2 | 3/2012 | Garg et al. |
| 8,160,020 B2 | 4/2012 | Eyuboglu et al. |
| 8,160,629 B2 | 4/2012 | Mate et al. |
| 8,160,631 B2 | 4/2012 | Raghothaman et al. |
| 8,165,528 B2 | 4/2012 | Raghothaman et al. |
| 8,170,598 B2 | 5/2012 | Raghothaman et al. |
| 8,176,327 B2 | 5/2012 | Xiong et al. |
| 8,195,187 B2 | 6/2012 | Eyuboglu et al. |
| 8,229,397 B2 | 7/2012 | Hou et al. |
| 8,229,498 B2 | 7/2012 | Ch'ng et al. |
| 8,259,671 B2 | 9/2012 | Raghothaman et al. |
| 8,280,376 B2 | 10/2012 | Rajagopalan et al. |
| 8,290,527 B2 | 10/2012 | Richardson |
| 8,295,256 B2 | 10/2012 | Humblet et al. |
| 8,295,818 B2 | 10/2012 | Palnati et al. |
| 8,311,570 B2 | 11/2012 | Richardson |
| 8,326,342 B2 | 12/2012 | Raghothaman et al. |
| 8,340,636 B2 | 12/2012 | Yin et al. |
| 8,345,694 B2 | 1/2013 | Den et al. |
| 8,346,220 B2 | 1/2013 | Mate et al. |
| 8,355,727 B2 | 1/2013 | Hoang et al. |
| 8,358,623 B2 | 1/2013 | Samar et al. |
| 8,379,625 B2 | 2/2013 | Humblet |
| 8,385,291 B2 | 2/2013 | Richardson et al. |
| 8,400,989 B2 | 3/2013 | Ch'ng et al. |
| 8,402,143 B2 | 3/2013 | Ramaswamy et al. |
| 8,428,601 B2 | 4/2013 | Samar et al. |
| 8,452,299 B2 | 5/2013 | Raghothaman et al. |
| 8,457,084 B2 | 6/2013 | Valmikam et al. |
| 8,503,342 B2 | 8/2013 | Richardson |
| 8,520,659 B2 | 8/2013 | Humblet |
| 8,532,658 B2 | 9/2013 | Knisely |
| 8,542,707 B2 | 9/2013 | Hou et al. |
| 8,543,139 B2 | 9/2013 | Samar et al. |
| 8,554,231 B2 | 10/2013 | Jones |
| 8,577,367 B2* | 11/2013 | Ishihara .................... 455/435.2 |
| 8,594,663 B2 | 11/2013 | Ch'ng et al. |
| 8,615,238 B2 | 12/2013 | Eyuboglu et al. |
| 8,615,593 B2 | 12/2013 | Ch'ng et al. |
| 8,619,702 B2 | 12/2013 | Garg et al. |
| 8,639,247 B2 | 1/2014 | Ng et al. |
| 8,688,809 B2 | 4/2014 | Ch'ng et al. |
| 8,693,987 B2 | 4/2014 | Chiussi et al. |
| 8,711,845 B2* | 4/2014 | Miyata .......................... 370/352 |
| 8,718,697 B2 | 5/2014 | Srinivas et al. |
| 8,731,574 B2 | 5/2014 | Ch'ng et al. |
| 8,750,271 B2 | 6/2014 | Jones |
| 8,774,134 B2 | 7/2014 | Raghothaman et al. |
| 8,781,483 B2 | 7/2014 | Ch'ng et al. |
| 8,805,371 B2 | 8/2014 | Richardson et al. |
| 8,843,638 B2 | 9/2014 | Garg et al. |
| 8,873,512 B2 | 10/2014 | Richardson et al. |
| 8,886,249 B2 | 11/2014 | Richardson |
| 8,909,278 B2 | 12/2014 | Rao et al. |
| 8,942,136 B2 | 1/2015 | Humblet |
| 2007/0140218 A1 | 6/2007 | Nair et al. |
| 2007/0220573 A1 | 9/2007 | Chiussi et al. |
| 2007/0230419 A1 | 10/2007 | Raman et al. |
| 2007/0242648 A1 | 10/2007 | Garg et al. |
| 2008/0003988 A1 | 1/2008 | Richardson |
| 2009/0168766 A1 | 7/2009 | Eyuboglu et al. |
| 2010/0165957 A1 | 7/2010 | Hegde et al. |
| 2010/0165960 A1 | 7/2010 | Richardson |
| 2010/0167718 A1 | 7/2010 | Chiussi et al. |
| 2011/0044248 A1* | 2/2011 | Saranu et al. ................. 370/328 |
| 2013/0136104 A1 | 5/2013 | Samar et al. |
| 2014/0003389 A1 | 1/2014 | Wang et al. |
| 2014/0177549 A1 | 6/2014 | Knisely et al. |
| 2014/0219162 A1 | 8/2014 | Eyuboglu et al. |
| 2014/0219255 A1 | 8/2014 | Eyuboglu et al. |
| 2014/0219267 A1 | 8/2014 | Eyuboglu et al. |

OTHER PUBLICATIONS

3$^{rd}$ Generation Partnership Project "3GPP2", "cdma2000 High Rate Packet Data Air Interface Specification", TIA/EIA/IS-856, C.S0024, version 4.0, Oct. 25, 2002 (548 pages).

3$^{rd}$ Generation Partnership Project "3GPP2", "cdma2000 High Rate Data Air Interface Specification", TIA/EIA/IS-856, C.S0024-A, version 2.0, Jul. 2005 (1227 pages).

3$^{rd}$ Generation Partnership Project "3GPP2", "cdma2000 High Rate Data Air Interface Specification", TIA/EIA/IS-856, C.S0024-B, version 1.0, Apr. 2006 (1623 pages).

3$^{rd}$ Generation Partnership Project 2 "3GPP2", "cdma2000 High Rate Packet Data Interface Specification", C.S0024, version 2, Oct. 27, 2000 (441 pages).

3$^{rd}$ Generation Partnership Project 2 "3GPP2", "cdma2000 High Rate Packet Data Interface Specification", C.S0024-B, version 2, Mar. 2007 (1627 pages).

3$^{rd}$ Generation Partnership Project 2 "3GPP2", "Introduction to cdma2000 Standards for Spread Spectrum Systems", 3Gpp2 C.S0001-D, Version 2.0, Sep. 6, 2005, Release D (16 pages).

3$^{rd}$ Generation Partnership Project 2 "3GPP2", "Physical Layer Standard for cdma2000 Spread Spectrum Systems", 3GPP2 C.S0002-D, Version 2.0, Sep. 6, 2005, Revision D (538 pages).

3$^{rd}$ Generation Partnership Project 2 "3GPP2", "Medium Access Control (MAC) Standard for cdma2000 Spread Spectrum Systems", 3GPP2 C.S0003-D, Version 2.0, Sep. 2005, Release D (255 pages).

3$^{rd}$ Generation Partnership Project 2 "3GPP2", "Signaling Link Access Control (LAC) Standard for cdma2000 Spread Spectrum Systems", Release D, 3GPP2 C.S0004-D, Version 2.0, Sep. 2005, Revision D. v2.0, (264 pages).

3$^{rd}$ Generation Partnership Project 2 "3GPP2", "Upper Layer (Layer 3) Signaling Standard for cdma2000 Spread Spectrum Systems", Release D, 3GPP2 C.S0005-D, Version 2.0, Sep. 2005, Release D (2367 pages).

3$^{rd}$ Generation Partnership Project 2 "3GPP2", "Analog Signaling Standard for cdma2000 Spread Spectrum Systems", 3GPP2 C.S0006-D, Version 2.0, Sep. 2005, Release D (95 pages).

3$^{rd}$ Generation Partnership Project (3GPP); Technical Specification Group Services and System Aspects; Circuit Switched (CS) fallback in Evolved Packet System (EPS); Stage 2 (Release 8), 3GPP TS 23.272 v8.12.0, Jun. 2012 (56 pages).

3rd Generation Partnership Project (3GPP); Technical Specification Group Services and System Aspects; Circuit Switched (CS) fallback in Evolved Packet System (EPS); Stage 2 (Release 9), 3GPP TS 23.272 v9.15.0, Sep. 2013 (74 pages).

(56) References Cited

OTHER PUBLICATIONS

Wikipedia.org, "LTE (Communication)", Long Term Evolution, retrieved from Internet on Jan. 14, 2015, http://en.wikipedia.org/wiki/LTE_(telecommunication), Jan. 14, 2015 (10 pages).

3rd Generation Partnership Project (3GPP); Technical Specification Group Core Network and Terminals; Optimized Handover Procedures and Protocol between Eutran access and non-3GPP accesses (S102); Stage 3 (Release 9), 3GPP TS 29.277 v9.2.0, Jun. 2010 (11 pages).

3rd Generation Partnership Project (3GPP); Interoperability Specification (IOS) for High Rate Packet Data (HRPD) Radio Access Network Interfaces with Session Control in the Access Network; 3GPP A.S0008-C v4.0, Apr. 2011 (708 pages).

3rd Generation Partnership Project 2 (3GPP2); E-UTRAN—CDMA 1x Connectivity and Interworking Air Interface Specification, 3GPP2 C.S0097-0, Version 2.0, Apr. 2011 (66 pages).

3rd Generation Partnership Project 2 (3GPP2); Interoperability Specification (IOS) for Femtocell Access Points, 3GPP2 A.S0024-A v1.0, Apr. 2011 (128 pages).

3rd Generation Partnership Project 2 (3GPP2); "Map Enhancements for CDMA Packet Data Service (C-PDS)", X.S0001-A, version 1.0, Apr. 2007 (193 pages).

* cited by examiner

PROVIDING CIRCUIT SWITCHED SERVICE

CROSS-REFERENCE TO RELATED APPLICATION

Priority is hereby claimed to U.S. Provisional Application No. 61/653,458 filed on May 31, 2012. The contents of U.S. Provisional Application No. 61/653,458 are incorporated herein by reference.

TECHNICAL FIELD

This disclosure relates generally to providing circuit switched service, e.g. voice, from a legacy circuit switched femtocell ("femto") network through a handset that operates with a fourth generation (4G) packet switched data network.

BACKGROUND

A long term evolution (LTE) network is an example of a 4G data network. As described in wikipedia.org, "LTE . . . is a standard for wireless communication of high-speed data for mobile phones and data terminals. It is based on the GSM/EDGE and UMTS/HSPA network technologies, increasing the capacity and speed using new modulation techniques. The standard is developed by the 3GPP (3rd Generation Partnership Project) and is specified in its Release 8 document series, with minor enhancements described in Release 9."

While LTE networks have been deployed to provide packet data services, such as Web browsing, LTE networks do not typically provide reliable voice service (referred to as "voice-over LTE").

SUMMARY

An example process is performed by a radio network access point that configured to provide access to a first network that provides voice services. The example process may comprise the following operations: receiving a hand-off request at the radio network access point, where the hand-off request is for user equipment connected to a second network that provides data services, and where the second network is different from the first network; replying to the hand-off request with channel assignment information, where the channel assignment information comprises a first code and corresponds to a first communication channel over which the radio network access point is configured to communicate, where the first code comprises a common Walsh code that is reserved for enhanced circuit switched fallback service (eCSFB), and where the first communication channel is reserved by various radio network access points; receiving a message from the user equipment indicating that the user equipment has a connection to the radio network access point using the first communication channel; and redirecting the user equipment to a second code and thus a second communication channel to maintain the connection, where the second communication channel is different from the first communication channel. The example process may include one or more of the following features, either alone or in combination.

The first network may comprise a second generation (2G) or a third generation (3G) network and the second network may comprise a fourth generation (4G) network. The first network may be a 1 XRTT femto network and the second network may be a long term evolution (LTE) macro network.

Replying to the hand-off request with channel assignment information may comprise replying if the radio network access point has capacity. The first communication channel may be reserved by various radio network access points for eCSFB service. The second communication channel may be a communication channel that is not otherwise used by the radio network access point.

The first communication channel may be usable by the various radio network access points for communication. The second communication may be different for different radio network access points.

An example system may comprise a first device configured to receive signal measurements from user equipment, where the signal measurements indicate strengths of signals of corresponding access points proximate to the user equipment that are configured to provide voice services over a first network. The first device is also configured to output a set of first access points that are targets of connection for the user equipment, where the user equipment is connected to a second network that is different from the first network. The example system may also comprise: a second device configured to pre-select a type of access point from the first set to be a candidate target; and a third device (i) to identify a second set of access points of the pre-selected type, (ii) to send a hand-off request to the second set of access points, (iii) to receive a response from a target access point among the second set, where the response comprises channel assignment information, where the channel assignment information comprises a first code and corresponds to a first communication channel over which the target access point is configured to communicate, and where the first code comprises a common Walsh code that is reserved for enhanced circuit switched fallback service (eCSFB), and (iii) to output the channel assignment information on a path to the user equipment via both the first network and the second network. The user equipment may be configured to receive the channel assignment information and to use the channel assignment information to establish a connection to the target access point. The target access point may be configured to receive a message from the user equipment via the first communication channel indicating that the user equipment has the connection to the target access point and to redirect the user equipment to a second code and thus to a second communication channel to maintain the connection. The example system may include one or more of the following features, either alone or in combination.

The first network may comprise a second generation (2G) or a third generation (3G) network and the second network may comprise a fourth generation (4G) network. The first network may be a 1XRTT femto network and the second network may be a long term evolution (LTE) macro network.

The first communication channel may be reserved by various radio network access points for eCSFB (enhanced Circuit Switched Fallback) service. The second communication channel may be a communication channel that is not otherwise used by the radio network access point. The first device may comprise an eNB (evolved NodeB), the second device may comprise an internetworking function box configured to enable communication between the first network and the second network, and the third device may comprise a server configured to communicate with private access points.

Each access point in the second set of access points may be configured to communicate using the same channel assignment information. The same channel assignment information may be for the first communication channel.

The third device may be configured to look-up locally stored information for access points registered with the third device in order to narrow a number of access points that could be the target access point, where the third device sends the hand-off request to the number of access points. The target access point may be configured to redirect the user equipment to another traffic channel having a different Walsh code so that a traffic channel corresponding to the common Walsh code and be freed to serve a next eCSFB call.

Any two or more of the features described in this specification, including in this summary section, can be combined to form implementations not specifically described herein.

The systems and techniques described herein, or portions thereof, can be implemented as/controlled by a computer program product that includes instructions that are stored on one or more non-transitory machine-readable storage media, and that are executable on one or more processing devices to control (e.g., coordinate) the operations described herein. The systems and techniques described herein, or portions thereof, can be implemented as an apparatus, method, or electronic system that can include one or more processing devices and memory to store executable instructions to implement various operations.

The details of one or more implementations are set forth in the accompanying drawings and the description below. Other features and advantages will be apparent from the description and drawings, and from the claims.

DESCRIPTION OF THE DRAWINGS

Like reference numerals indicate like elements.

DETAILED DESCRIPTION

Cellular wireless communications systems are designed to serve multiple wireless-enabled devices distributed over a large geographic area by dividing the area into regions called cells or cell areas. Within (e.g., at the center of) each cell area, a network-side access device (e.g., an access point) is located to serve client devices in the cell area, which are referred to as access terminals (ATs) or user equipment (UE). Examples of UEs include, but are not limited to, wireless-enabled mobile devices, such as cellular telephones, data access card used in laptops, personal digital assistants (PDAs), and/or other user equipment. A UE generally establishes a call, also referred to as a communication session, with an access point to communicate with other entities (e.g., servers) in the network. The communications link between a UE and an access point may be described in terms of separate directional portions. For example, the link from the access point to the UE may be referred to as the downlink link (DL), while the link from the UE to the access point may be referred to as the uplink (UL).

Figure 1:
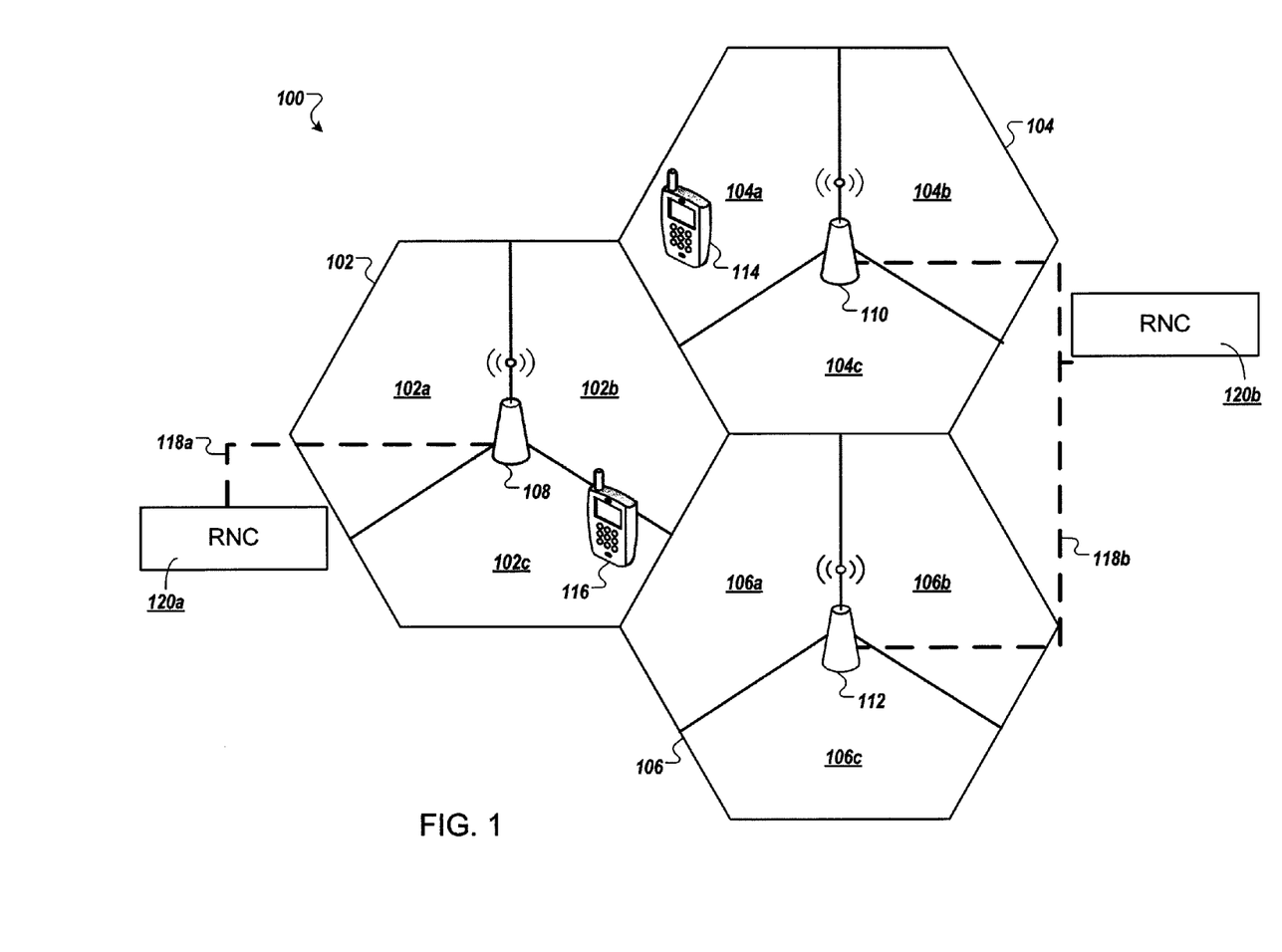
FIG. 1 is a diagram showing a radio access network (RAN).

Referring to FIG. 1, a radio access network (RAN) 100 includes multiple macro access points 108, 110, and 112 located in macrocell areas 102, 104, and 106, respectively. Each macrocell area may be further divided into sectors 102*a-c*, 104 *a-c*, 106*a-c*, respectively, by using multiple sectorized antennas at the macro access points. Macrocell areas 102, 104, and 106 may include one or more private access points (described below). The macro access points 108, 110, and 112 are each configured to communicate with a UE over an airlink. For example, macro access point 108 may communicate with UE 116, while macro access point 110 may communicate with UE 114. Macro access points 108, 110, and 112 are electrically connected over a backhaul connection (e.g., backhaul connection 118*a* or 118*b*) to a radio network controller (RNC) which, in turn, communicates with the service provider's core network, e.g., via RNC 120*a* or 120*b*, which may be one or more physical devices at different locations.

Figure 2:
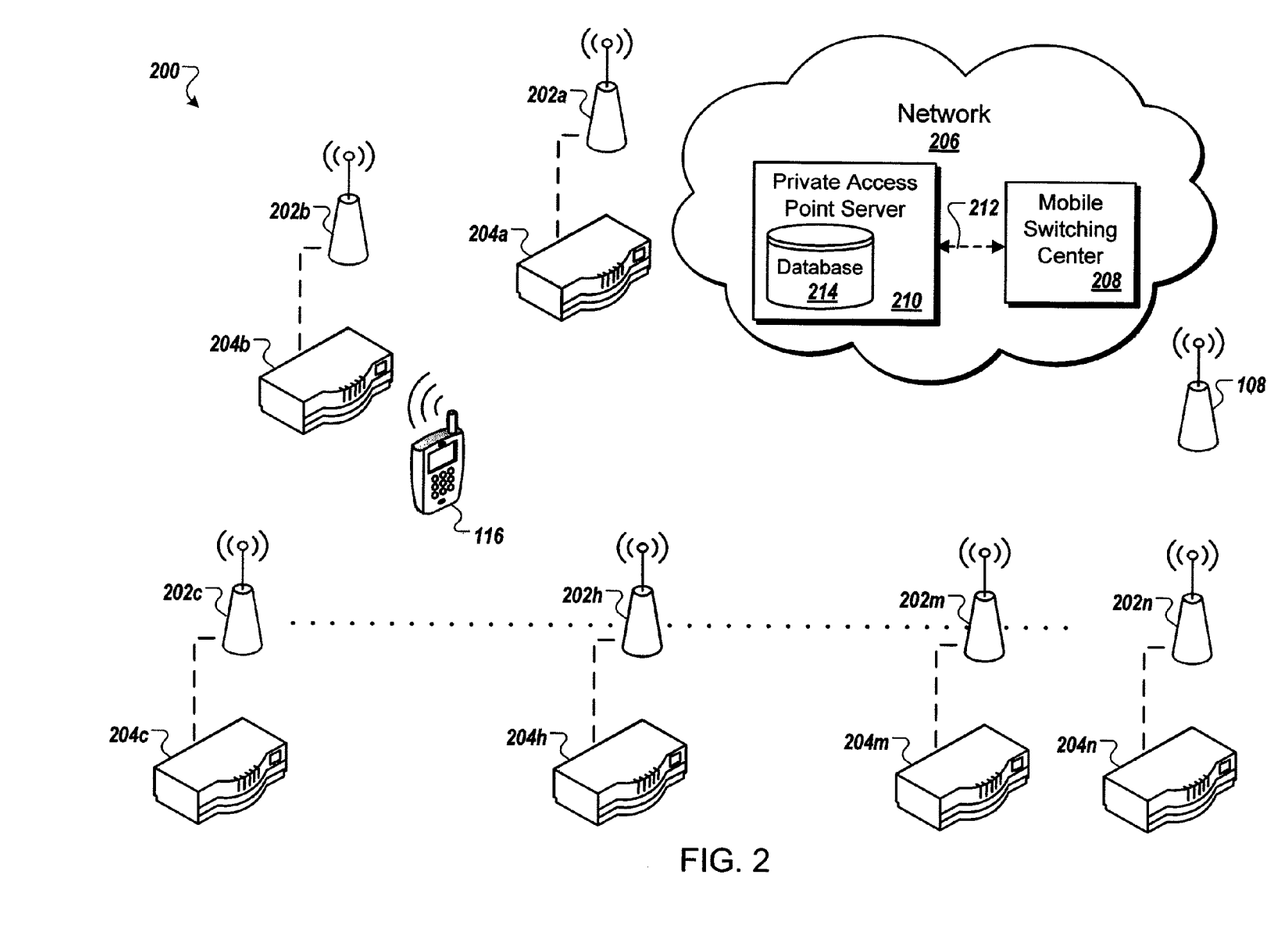
FIG. 2 is a diagram showing a private access point in a RAN

A radio network (e.g., wireless) access point may be deployed in a home, an office, a public space, or a restaurant in a similar manner as a WiFi® access point. This type of wireless access point may be referred to as a private access point. One or more private access points, as shown in FIG. 2, may be deployed within range of a macro access point 108, which is in a wireless communication network 200. For example, private access points 202*a-n* may be arranged within sector 102*c* of cell 102 (shown in FIG. 1). There may be any number of private access points within the range of the macro access point 108 (e.g., hundreds, thousands, etc.). Each private access point may be identified, in part, by a frequency channel (e.g., channel number (CH)), and a code space allocation pseudo-noise code (e.g., PN offset value). Each private access point 202*a-n* may be connected to an available high-speed internet connection, such as a DSL or cable modem 204*a-n*, as a backhaul with the RNC/PDSN (Packet Data Switched Network) functionality implemented outside each private access point 202*a-n*. Examples of private access points 202*a-n* include, but are not limited to, femtocells and picocells. In some examples, a private access point may be integrated into a cable modem or other network hardware, such as a router or WiFi access point.

The RAN 100 shown in FIG. 1, and the wireless communication network 200 shown in FIG. 2, may use both (and, possibly, at the same time) a 1XRTT protocol and an EV-DO protocol for communication among a UE, e.g., UEs 114, 116, a radio network access point, e.g., macro access points 108, 110, 112, and/or private access points 202*a-n*. Although this description uses terminology from the 1XRTT (1X) and EV-DO air interface standards in CDMA2000 (Code Division Multiple Access) networks, concepts described herein are not so limited.

As explained above, access points, and particularly private access points (e.g., femtocells), may perform some type of closed access control. For example, not every UE may utilize the services of a particular private access point. In some cases, the owner of a private access point may choose to control which UEs are allowed to utilize the services of that private access point. Individual UEs may be authorized or not authorized (unauthorized) to use the services of the private access point. For example, the private access point may include an Authorized User List (AUL) for 1X service. The AUL may be stored in memory on the private access point or otherwise accessible thereto. Each AUL may be set-up with the wireless carrier, e.g., through a Web-based interface, and sent to the private access point for storage. The AUL for a particular private access point may include information to identify authorized UEs. For example, an AUL may contain one or more identifiers stored in the UE's User Identity Module (UIM) card, Subscriber Identity Module (SIM) card (for UMTS/GSM—Universal Mobile Telecommunications Service/Global System for Mobile Communications), or other type of user-specific card.

UEs that are not identified on the AUL of a particular private access point are not generally authorized to access that private access point. So, a particular UE may be authorized on one private access point and unauthorized on another private access point. Just as a private access point may identify more than one authorized UE in its AUL, a UE may be authorized on more than one private access point.

When an authorized UE (e.g., UE 116) is present within coverage of a private access point (e.g., private access point 202*b*), the authorized UE may use the private access point rather than a regular cellular radio network access point, such as macro access point 108, to place or receive voice calls and data connections, even if the UE is otherwise within the cell region for the macro access point. If the UE is not authorized for the private access point, the UE will use the macro access point for voice and data communications.

We sometimes refer to a macro access point as a standard access point or macro BTS (Base Transceiver Station) to distinguish the macro access point from a private access point. Referring to FIG. 2, macro access point 108 provides direct access to a wider core network 206 (e.g., radio access network). For example, macro access point 108 may provide UE 116 with a communication link to a mobile switching center (MSC) 208 within network 206. MSC 208 may coordinate mobility management for active communication sessions (e.g., voice calls, data transfers, etc.) of UE 116. MSC 208 may also enable UE 116 to establish communication links with other devices and systems (e.g., a Plain Old Telephone System (POTS)) to engage in communication sessions for voice and/or data communications An LTE network may operate in the vicinity of a 1X RAN such as that shown in FIGS. 1 and 2. As noted, while LTE networks have been deployed to provide packet data services, such as Web browsing, LTE networks do not yet provide reliable voice-over LTE. Accordingly, example processes are described herein for using a 4G network, such as LTE, for packet data services and a legacy (e.g., a 2G or a 3G—second or third generation, respectively) voice network, such as a 1X RAN, for voice communications. In this regard, the processes described herein are described with respect to femtocells in a 1X RAN (e.g., as described above); however, the processes are not limited to use with 1X RANs, but also may be used with GSM/UMTS RANs. The processes described herein are typically performed in an area where a 1X RAN and an LTE network have overlapping coverage.

The example processes described herein may be used with any type of private access point. For the sake of illustration, use with a 1X femtocell is described. In this regard, a private access point, such as a femtocell, typically has limited coverage, e.g., around a 100 foot radius. An LTE macrocell may have ten times, or more, than that extent of coverage. So, within the coverage area of an LTE macrocell, there may be numerous femtocells. A number of these femtocells may use the same radio resources, e.g., frequency channel and PN offset, due to resource limitations of a carrier supporting the overall network. This is allowed where coverages of these femtocells do not overlap.

Enhanced Circuit Switched Fallback (eCSFB) is standardized by 3GPP [TS-23.272-R9], [TS-29.277-R9] and 3GPP2 [A.50008-C-v4.0], [C.50097-0-v2.0], as a solution for operators to provide voice and other CS-domain (Circuit Switched-domain) services to an LTE subscriber using existing (e.g., legacy) circuit switched network, such as 1XRTT (1X). The above standard solution is applicable for eCSFB in 1X macro networks, but not for eCSFB 1X femto networks. The processes described herein attempt to provide an End to End (E2E) solution to achieve eCSFB service in 1X femto networks. Furthermore, the processes can be applied to other services, such as a hand-in service from a macro to a femto, and to other types of femto networks, such as the GSM/UMTS femto networks.

As noted, within the coverage area of an LTE macro cell, there may be multiple 1X femtocells. Each of these femtocells has limited coverage. In order to reduce the RF (Radio Frequency) interference in 1X femto networks with limited RF resources (e.g., a limited number of frequency channel and PN offset combinations), femtocells that are close to each other (or have overlapping coverage) are typically assigned different frequency channel and PN offset combinations for operation. By contrast, femtocells located far enough away from each other may be assigned the same frequency channel and PN offset combination for operation. Because there are many 1X femtocells in an LTE coverage area that use the same radio resources, and in practice they share the same cell ID (MSCID (Mobile Switching Center Identification), BTSID (Base Transceiver Station Identification), SectorID (Sector Identification)) of the nearest 1X macro cell, it can be difficult for a UE to establish a connection to the correct single femtocell for eCSFB purposes, thereby often resulting in eCSFB failure. The processes described herein may be used to determine which of the available femtocells to select for eCSFB.

In operation, the eCSFB to 1X service described herein allows an eCSFB-capable handset to register with a 1X network via LTE tunneled signaling after the eCSFB-capable handset has attached/registered to the LTE network. The eCSFB-capable handset remains "camped" on the LTE network while the eCSFB-capable handset is idle. When a voice call comes-in or is originated, the eCSFB-capable handset will "fall-back" to the 1X network to service the voice call. In meantime, live LTE data sessions are suspended and a UE (user equipment—in this example, an eCSFB handset) context is released in the E-UTRAN (evolved UMTS Terrestrial Radio Access Network). After the voice call ends, the eCSFB-capable handset returns to the LTE network by performing cell re-selection, and the suspended data sessions are resumed.

Figure 3:
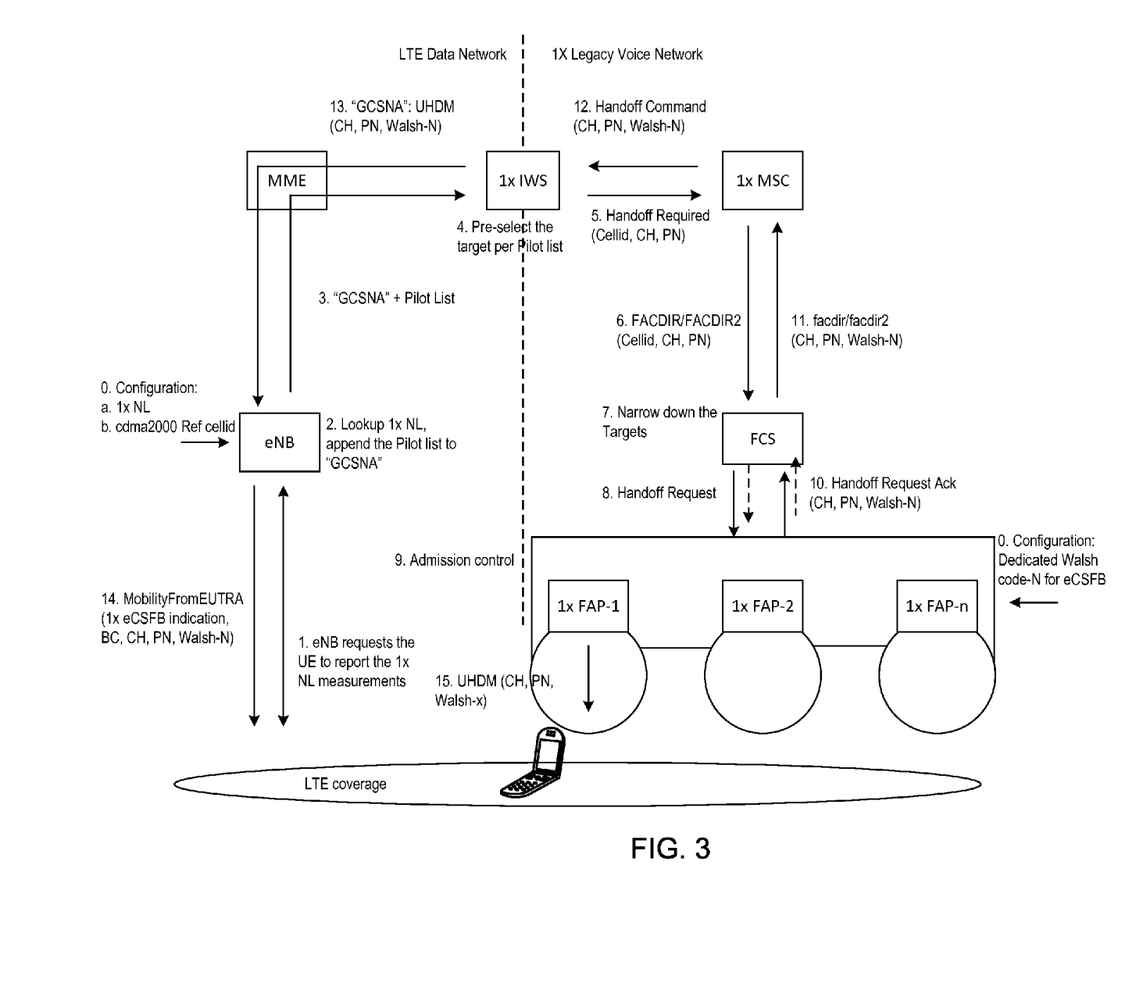
FIG. 3 is a block diagram showing a process for performing enhanced circuit switched fallback (eCSFB) using a legacy voice 1X femto network.

FIG. 3 shows an example wireless network area that has LTE coverage and 1X coverage. Femtocells (FAPs) are used to connect to a handset (UE) to provide voice coverage. Data coverage is typically provided over the LTE network. An internetworking function box (IWS) connects the two networks, and translates communication from LTE-appropriate protocols to 1X-appropriate protocols.

FIG. 3 is illustrates an example of a process for performing eCSFB using a femtocell in a legacy 1X network. The various operations 1 to 15 described below may be performed by one or more processing devices resident in the various devices depicted in FIG. 3. The one or more processing devices may execute stored machine-executable instruction to perform the operations. The example process is not limited to use with the devices shown in FIG. 3 or to the network configuration shown in FIG. 3. Furthermore, the functionalities of any two or more devices of FIG. 3 may be combined into individual device(s), and/or one or more the operations described herein may be deleted or combined with others.

Operation 0:

The following configurations are set at an eNB of each LTE cell:
1. cdma2000 reference cell id [TS-23.272-R9] for eCSFB
2. A 1x NL (Neighbor List) containing both a 1x Macro NL and 1x Femto NL
3. A 1x Femto NL containing up to Max1xFemtoNeighborCell entries, with each entry including at least the following attributes: {FCSID, BTSID, SectorID, BC, CH, PN},
   i. Max1xFemtoNeighborCell is configurable by an operator;
   ii. FCSID is the Femto Convergence Server ID;
   iii. (BTSID, SectorID) equals identifiers for the cdma2000 reference cell id [TS-23.272-R9];
   iv. (BC, CH, PN) are radio spectrum resources reserved by the operator for 1X Femto service.

The following configuration is set for each 1x Femto Access Point (FAP):

1. A reserved common Walsh code dedicated for eCSFB calls.

In operation 0 above, all 1X femtocells are reserved a common Walsh code, e.g., Walsh-N in a downlink (DL) traffic channel that is reserved for the eCSFB service. This is referred to as a "Dedicated common Walsh code reservation". The NL refers to neighbor lists for each 1X macrocell and each 1X femtocell (FAP). A neighbor list identifies neighboring devices, e.g., in a network. The FCS is a femto-convergence server, which converges/distributes control plane and data plane packets from/to femtocells and acts as a single interface between the 1X femto network and the 1X core network. In the context of eCSFB, the FCS functions include narrowing-down target femtocells for use in eCSFB using cell IDs (identifier/identification), frequency channel IDs or numbers, and PN offsets.

For each LTE cell, the 1X Neighbor List (NL) is configured at an eNB (evolved NodeB) and includes a 1X Macro NL and a 1X femto NL In this regard, Node B is the UMTS equivalent to the BTS (base transceiver station) used in GSM. eNB is the element of LTE that is an evolution of Node B.

The 1X femto NL contains up to "Max1XfemtoNeighborCell" entries, and each entry includes at least following attributes: {FCSID (FCS Identity), BTSID (BTS Identification), SectorID (sector Identification), BC (band-class), CH (frequency channel identification), PN (PN offset)}, where
 a. Max1XfemtoNeighborCell is configurable by an operator;
 b. FCSID is the femto Convergence Server ID;
 c. (BTSID, SectorID) is the cdma2000 reference cell id [TS-23.272-R9].
 d. (BC, CH, PN) pool are for 1X femto service channel usage (not beacon channel) per operator policy.

In operation, the eNB requests the UE to report the measurements of 1X neighboring devices' pilot signal strength before the eNB starts the eCSFB call set-up procedure. Upon receiving, from the UE, the 1X neighbors' pilot measurement reports (PN, RSSI (Receives Signal Strength Indication)), the eNB looks-up its NL to build a pilot list that includes, in this example, all devices with matching frequency channels (CH) and PN offsets (PN), as reported. These matching devices are considered to be eCSFB target candidates. The eNB appends the pilot list to a GCSNA (Generic Circuit Service Notification Application) message tunneled to the Interworking Solution Function (IWS). The pilot list is structured as {MSCID or FCSID, BTSID, SectorID, BC, CH, PN, RSSI}. If a candidate is a femtocell, the ID is FCSID. If a candidate is a macro cell, the ID is a MSCID. The following assumes that the candidate is a femtocell.

Operation 1:
 The eNB requests the UE to report the pilot strength measurement of its 1x neighbors when it receives, from the MME, a request to start to set up a Mobile Originated (MO) eCSFB call or a Mobile Terminated (MT) eCSFB call. The request is indicated in the SI "UE Context Modification Response" or SI "Initial UE Context Response", both containing a "CS Fallback Indicator".

In operation 1 above, MME refers to an LTE mobility management entity. The UE (e.g., handset) reports the pilot signal strength of various devices, such as femtocells, to which it may connect.

Operation 2:
 After receiving the measurement report (PN, RSSI) from the UE, the eNB looks-up its NL to build up a pilot list comprised of all cells with the matching (CH, PN) as carried in the reports. These matching cells constitute the eCSFB target candidates. The eNB then appends the pilot list to the GCSNA message tunneled to the IWS. The GCSNA message may be either the "GCSNA: Origination" for a Mobile originated call, or the "GCSNA: PRM" for a Mobile terminated call[A.S0008-C-v4.0]. A pilot list is structured as {MSCID or FCSID, BTSID, SectorID, BC, CH, PN, RSSI}. If a candidate is a Femtocell, it is FCSID. If it is a macro cell, it is a MSCID.

The GCSNA message is a generic tunneling message used to tunnel through the LTE network to the 1X IWS. The pilot list here includes devices (e.g., femtocells) that have channel IDs and PN offsets that match those of the UE that performed the reporting in operation 1 above. These constitute eCSFB target candidates.

Operation 3:
 The eNB sends, to the IWS via MME, the GCSNA message with the appended pilot list.

Operation 4:
 The IWS ranks and sorts the RSSI across the candidates in the appended pilot list, then pre-selects one candidate as the eCSFB target, e.g., the one with the strongest RSSI.

Upon receiving the GCSNA message with the appended pilot list from the MME, the IWS ranks and sorts the RSSI for various candidates, then pre-selects one candidate as the eCSFB target, e.g., a femtocell with the strongest RSSI. The one candidate in this case is a type of device having a particular channel ID and PN offset. However, there may be multiple devices having the same bandclass (BD), channel ID and PN offset on the 1X femto network.

Operation 5:
 The IWS initiates an inter-MSC handoff procedure towards the FCS if the selected target is a Femtocell (as identified by the FCSID). The IWS sends, to the MSC, the "Handoff Required" message containing the target cell information (CellID, BC, CH, PN). CellID includes the FCSID, BTSID, SectorID.

If the selected target is a femtocell (as identified by a FCSID-FCS Identification), the IWS will initiate an inter-MSC handoff procedure towards the FCS by sending, to the MSC, a "Handoff Required" message containing the target femtocell's information (CellID, CH, PN). CellID includes the FCSID, BTSID and SectorID. Based on the FCSID, the MSC will send an "FACDIR/FACDIR2" (FACility DIRective) message to the FCS carrying the target femtocell's information.

In some implementations, the operations of ranking and sorting the RSSI across the candidates, and pre-selecting the target by the IWS as described in operation 4, may be performed by the eNB. In that case, the pilot list appended with the eNB would include only one entry: the pre-selected target. In this case, the IWS directly initiates the inter-MSC handoff procedure towards the FCS.

Operation 6:
 The MSC forwards, to the FCS, a Handoff request via the "FACDIR/FACDIR2" message [X.S0001-A-v1.0], which contains the eCSFB target cell's information {FCSID, BTSID, SectorID, BC, CH, PN}.

Operation 7:
 The FCS narrows-down the total number of the eCSFB target Femtocells by looking-up its locally stored information of all the registered Femtocells. The Femtocells which match the {BTSID, SectorID, BC, CH, PN} as contained in the "FACDIR/FACDIR2" are considered as eCSFB targets.

More specifically, the FCS looks-up locally stored information for all femtocells registered with the FCS in order to narrow the total number of the femtocells that could be the eCSFB target. The femtocell(s) that match the {BTSID, SectorID, BC, CH, PN} as carried in the "FACDIR/FACDIR2" are determined to be candidates for the eCSFB target. The FCS then sends the "Handoff Request" message to these matching femtocells and waits for their response to occur within a predefined time.

Operation 8:
> The FCS sends the "Handoff Request" message to matching Femtocells and waits for their response.

Operation 9 and 10:
> The FAPs, which received the "Handoff Request" from the FCS, perform admission control. If a Femtocell has the capacity to serve the Hand-in call, the Femtocell replies to FCS with a "Handoff Request Ack" message containing channel assignment information (BC, CH, PN, Walsh-N). Walsh-N is the reserved common Walsh code dedicated for an eCSFB call. In meantime, the Femtocell starts sending null frames on the assigned channel to allow the handset to capture the Femtocell, and waits for a "Handoff Completion" response from the handset in the Uplink (UL) channel using the Long Code Mask (LCM) derived from the handset identity.

In this regard, a number of different femtocells are reserved a common Walsh code (corresponding to a common reserved traffic channel for the eCSFB service) as described in operation 0, e.g., Walsh-N in a downlink (DL) traffic channel that is dedicated to for the eCSFB service. When a femtocell receives the "Handoff Request" message from the FCS indicating that there is an incoming eCSFB call request, if a femtocell has capacity to admit the handoff request, the femtocell will reply to the FCS with a "Handoff Request Ack" (acknowledgement) message, which includes channel assignment information (Band-class-BC, Channel-CH, PN offset-PN, Walsh-N) for the eCSFB call. Multiple femtocells may reply. In meantime, each such femtocell starts sending null frames on the assigned channel Walsh-N to allow the handset to capture the femtocell in the corresponding reserved traffic channel, and waits for a "Handoff Completion" response from the handset in the Uplink (UL) channel with a "Long Code Mask" (LCM) derived from the handset identity.

Operation 11:
> If the FCS receives one or more "Handoff Request Ack" messages, the FCS reply to the MSC with a single "facdir/facdir2" message, which includes channel assignment information (BC, CH, PN, Walsh-N). This message indicates that the eCSFB call is accepted by the target Femtocell and assigned to (BC, CH, PN, Walsh-N).

If the FCS receives one or more "Handoff Request Ack" message, the FCS replies to the MSC with the "FACDIR/FACDIR2" message containing the channel assignment information (BC, Channel, PN, Walsh-N) for the eCSFB call. This indicates that the eCSFB call is accepted by one or more target femtocells. In this example, the channel assignment will be tunneled to the handset via a UHDM message.

Operation 12:
> The MSC replies to the IWS the "Handoff Command" message including the channel assignment information (BC, CH, PN, Walsh-N).

Operation 13:
> The IWS converts the "Handoff Command" message to a tunneling "GCSNA: UHDM" message, which includes channel assignment information (BC, Channel, PN, Walsh-N). This message is tunneled to eNB.

Operation 14:
> The eNB converts the tunneled "GCSNA: UHDM" message to a "MobilityFromEUTRA" message and send that message to UE, including the 1x eCSFB indication and the channel assignment information (BC, Channel, PN, Walsh-N). The eNB then releases the UE's context in E-UTRAN. Any live LTE data sessions are suspended by the EPC. The UE tunes to the assigned DL channel Walsh-N. The UE sends the "Handoff Completion" message to the FAP once the UE detects the DL Walsh-N.

Operation 15:
> Upon receiving the "Handoff Completion" message from the UE, the FAP immediately redirects the UE to another Walsh code, e.g., Walsh-X, so that the dedicated Walsh-N can be freed to serve a next eCSFB call. Walsh-X is randomly assigned by the Femtocell among remaining available unused Walsh codes. When the FAP receives, from the UE, the "Handoff Completion" message corresponding to the Walsh-x assignment, the FAP can start to set-up a voice bearer path.

> Operation 15 concludes successful establishment of an eCSFB call in a 1x Femto network. After the eCSFB call ends, the UE returns to the LTE network by performing cell re-selection, and the previously suspended data sessions in the LTE network are resumed.

Regarding operation 15, after the eCSFB handset acquires the assigned dedicated Walsh code (BC, CH, PN, Walsh-N), the eCSFB handset responds with a "Handoff Completion" message in the corresponding UL channel. Upon receiving this response, in this example, the femtocell (e.g., FAP-1 in FIG. 3) immediately redirects the handset (the UE) to another traffic channel having a different Walsh code, e.g., Walsh-X (that is different from Walsh-N), so that the traffic channel corresponding to Walsh-N can be freed to serve a next eCSFB call. This is referred to as a "femtocell double redirect". Walsh-X (and the corresponding traffic channel) may be randomly assigned by the femtocell among available unused Walsh codes. In some example implementations, there should be only one femtocell that receives the "Handoff Completion" message. This femtocell is typically the one nearest to the handset. Other femtocells, which have also replied to the FCS with the "Handoff Request Ack" message containing their channel assignment information (e.g., BC, Channel, PN, Walsh-N) are far away from the handset, and thus will not receive the "Handoff Completion" message from the handset. Instead, these other femtocells will time-out. In this regard, femtocells with overlapping coverage areas are assigned different frequency channels and PN offsets to reduce mutual RF interference. Accordingly, femtocells with overlapping coverage areas will not both be selected as eCSFB candidates using FCS filtering as described in operation 7. Femtocells that are far enough apart so as to not to interfere with neighboring femtocell operations may use the same channel and PN offset and, therefore, may both be selected as eCSFB candidates.

The example process of FIG. 3 provides an end-to-end (E2E) solution to implement an eCSFB service in 1X networks.

The "dedicated common Walsh code reservation" and the "femtocell double redirect", examples of which are described above, can be applied to other services in femto networks, including both 1X femto networks and GSM/UMTS femto networks. These concepts are not limited to use with eCSFB service. For example, they can be used to select a target femtocell for a handset hand-in service from a macrocell to a femtocell. In the context of GSM/UMTS femto networks, the "dedicated common Walsh code reservation" could be an equivalent GSM/UMTS traffic channel common to all femtocells and the "femtocell double redirect" could be used to redirect the UE to another available GSM/UMTS traffic channel at each femtocell (which is specific per femtocell).

The foregoing is written in the context of the femtocell(s), access point(s), device(s) and/or server(s) performing operations. It is noted, however, that these hardware devices are controlled by computer programs, which are stored therein on one or more machine-readable storage media, and which are executed by one or more processing devices to perform all or part of the processes described herein attributed to the access point(s) and mobile device(s).

In this regard, the processes described herein can be implemented in digital electronic circuitry, or in computer hardware, firmware, software, or in combinations of them. The processes can be implemented as a computer program product, e.g., a computer program tangibly embodied in one or more non-transitory machine-readable storage media, for execution by, or to control the operation of, one or more data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a service network.

Elements of the processes described herein can be performed by one or more programmable processors executing a computer program to perform functions described herein by operating on input data and generating output. The elements of the processes can also be performed by, and apparatus therefor can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Machine-readable storage media suitable for embodying computer program instructions and data include, but are not limited to, all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The processes described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the system described herein, or any combination of such back-end, middleware, or front-end components. The components of the system can be interconnected by any form or medium of digital data service, e.g., a service network. Examples of service networks include a LAN, a WAN, e.g., the Internet, and include both wired and wireless networks.

The computing system can include clients and servers. A client and server are generally remote from each other and typically interact over a service network. The relationship of client and server arises by virtue of computer programs running on the respective computers and having a client-server relationship to each other.

Thus, the processes, and any feature thereof, may be implemented as a computer program product comprised of instructions that are stored on one or more non-transitory machine-readable storage media, and that are executable on one or more processing devices. The processes, and any feature thereof, may be implemented as an apparatus or system that includes one or more processing devices and memory to store executable instructions to implement the method.

Elements of the processes described herein can be omitted and/or rearranged in a different order to achieve the same, or similar, ends. Such derivative processes are also within the scope of the following claims. In this regard, the processes described herein can be performed in a different order and still achieve desirable results.

Other implementations are also within the scope of the following claims and other claims to which the applicant may be entitled. The foregoing are examples for illustration only and not to limit the alternatives in any way.

What is claimed is:

1. A method performed by a radio network access point configured to provide access to a first network that provides voice services, comprising:

receiving a hand-off request at the radio network access point, the hand-off request being for user equipment connected to a second network that provides data services, the second network being different from the first network;

replying to the hand-off request with channel assignment information, the channel assignment information comprising a first code corresponding to a first communication channel over which the radio network access point is configured to communicate, the first code, and thus the first communication channel, being reserved by multiple radio network access points within a same macro cell, the first code comprising a common Walsh code that is reserved for enhanced circuit switched fallback service (eCSFB) on the multiple radio network access points;

receiving a message from the user equipment indicating that the user equipment has a connection to the radio network access point using the first communication channel; and redirecting the user equipment to a second code, and thus a second communication channel, to maintain the connection without the first communication channel so that the first communication channel can be freed, the second code being a Walsh code that is different from the common Walsh code, the second communication channel being different from the first communication channel.

2. The method of claim 1, wherein the first network comprises a second generation (2G) or a third generation (3G) network and the second network comprises a fourth generation (4G) network.

3. The method of claim 2, wherein the first network is a 1XRTT femto network and the second network is a long term evolution (LTE) macro network.

4. The method of claim 1, wherein replying to the hand-off request with channel assignment information comprises replying if the radio network access point has capacity.

5. The method of claim 1, wherein the first communication channel is reserved by various radio network access points for eCSFB service.

6. The method of claim 1, wherein the second communication channel is a communication channel that is not otherwise used by the radio network access point.

7. The method of claim 1, wherein the first communication channel is usable by the various radio network access points for communication.

8. The method of claim 1, wherein the second communication is different for different radio network access points.

9. A radio network access point configured to provide access to a first network that provides voice services, comprising:
   memory storing instructions; and
   one or more processing devices for executing the instructions to perform operations comprising:
      receiving a hand-off request at the radio network access point, the hand-off request being for user equipment connected to a second network that provides data services, the second network being different from the first network;
      replying to the hand-off request with channel assignment information, the channel assignment information comprising a first code corresponding to a first communication channel over which the radio network access point is configured to communicate, the first code, and thus the first communication channel, being reserved by multiple radio network access points within a same macro cell, the first code comprising a common Walsh code that is reserved for enhanced circuit switched fallback service (eCSFB) on the multiple radio network access points;
      receiving a message from the user equipment indicating that the user equipment has a connection to the radio network access point using the first communication channel; and
      redirecting the user equipment to a second code, and thus a second communication channel, to maintain the connection without the first communication channel so that the first communication channel can be freed, the second code being a Walsh code that is different from the common Walsh code, the second communication channel being different from the first communication channel.

10. The radio network access point of claim 9, wherein the first network comprises a second generation (2G) or a third generation (3G) network and the second network comprises a fourth generation (4G) network.

11. The radio network access point of claim 10, wherein the first network is a 1XRTT femto network and the second network is a long term evolution (LTE) macro network.

12. The radio network access point of claim 9, wherein replying to the hand-off request with channel assignment information comprises replying if the radio network access point has capacity.

13. The radio network access point of claim 9, wherein the first communication channel is reserved by various radio network access points for eCSFB service.

14. The radio network access point of claim 9, wherein the second communication channel is a communication channel that is not otherwise used by the radio network access point.

15. The radio network access point of claim 9, wherein the first communication channel is usable by the various radio network access points for communication.

16. The radio network access point of claim 9, wherein the second communication is different for different radio network access points.

17. A system comprising:
   a first device configured to receive signal measurements from user equipment, the signal measurements indicating strengths of signals of corresponding access points proximate to the user equipment that are configured to provide voice services over a first network, and to output information for a set of first access points that are targets of connection for the user equipment, the user equipment being connected to a second network that is different from the first network;
   a second device configured to pre-select a type of access point from the first set to be a candidate target; and
   a third device (i) to identify a second set of access points of the pre-selected type, (ii) to send a hand-off request to the second set of access points, (iii) to receive a response from a target access point among the second set, the response comprising channel assignment information, the channel assignment information comprising a first code corresponding to a first communication channel over which the target access point is configured to communicate, the first code, and thus the first communication channel, being reserved by multiple radio network access points within a same macro cell, the first code comprising a common Walsh code that is reserved for enhanced circuit switched fallback service (eCSFB) on the multiple radio network access points, and (iii) to output the channel assignment information on a path to the user equipment;
   wherein the user equipment is configured to receive the channel assignment information and to use the channel assignment information to establish a connection to the target access point; and
   wherein the target access point is configured to receive a message from the user equipment via the first communication channel indicating that the user equipment has the connection to the target access point and to redirect the user equipment to a second code and thus to a second communication channel to maintain the connection without the first communication channel so that the first communication channel can be freed, the second code being a Walsh code that is different from the common Walsh code, the second communication channel being different from the first communication channel.

18. The system of claim 17, wherein the first network comprises a second generation (2G) or a third generation (3G) network and the second network comprises a fourth generation (4G) network.

19. The system of claim 18, wherein the first network is a 1XRTT femto network and the second network is a long term evolution (LTE) macro network.

20. The system of claim 17, wherein the first communication channel is reserved by various radio network access points for eCSFB service.

21. The system of claim 17, wherein the second communication channel is a communication channel that is not otherwise used by the radio network access point.

22. The system of claim 17, wherein the first device comprises an eNB, the second device comprises an internetworking function box configured to enable communication between the first network and the second network, and the third device comprises a server configured to communicate with private access points.

23. The system of claim 17, wherein each access point in the second set of access points is configured to communicate using the same channel assignment information.

24. The system of claim 23, wherein the same channel assignment information is for the first communication channel.

25. The system of claim 17, wherein the third device is configured to look-up locally stored information for access points registered with the third device in order to narrow a number of access points that could be the target access point, the third device sending the hand-off request to the number of access points.

26. The system of claim 17, wherein the target access point is configured to redirect the user equipment to another traffic channel having a different Walsh code so that a traffic channel corresponding to the common Walsh code and be freed to serve a next eCSFB call.

27. One or more non-transitory machine-readable storage media storing instructions that are executable by a radio network access point configured to provide access to a first network that provides voice services, the instructions being executable by the radio network access point to perform operations comprising:

receiving a hand-off request at the radio network access point, the hand-off request being for user equipment connected to a second network that provides data services, the second network being different from the first network;

replying to the hand-off request with channel assignment information, the channel assignment information comprising a first code corresponding to a first communication channel over which the radio network access point is configured to communicate, the first code, and thus the first communication channel, being reserved by multiple radio network access points within a same macro cell, the first code comprising a common Walsh code that is reserved for enhanced circuit switched fallback service (eCSFB) on the multiple radio network access points;

receiving a message from the user equipment indicating that the user equipment has a connection to the radio network access point using the first communication channel; and redirecting the user equipment to a second code, and thus a second communication channel, to maintain the connection without the first communication channel so that the first communication channel can be freed, the second code being a Walsh code that is different from the common Walsh code, the second communication channel being different from the first communication channel.

* * * * *